Patented Mar. 26, 1929.

1,706,695

UNITED STATES PATENT OFFICE.

AUGUST KLAGES, OF MAGDEBURG-SUDOST, GERMANY.

TREATMENT OF SEED.

No Drawing. Application filed May 17, 1926. Serial No. 109,573, and in Germany October 27, 1923.

This invention relates to improvements in treating seeds in order to destroy animal or vegetable pests or noxious agents, such as bacteria and the like.

The complex mercury compounds of aromatic bases in which the mercury is connected to a carbon atom have remarkably good fungicidal properties, excelling in this respect the complex mercury compounds of the phenols hitherto used, than which they are generally more active and in many cases more easily applied. For example, a solution of mercury-aniline (containing 17.5 per cent of mercury) of 0.25 per cent. strength kills completely the noxious agents known as *Tilletia tritici*, *Ustilago avenæ* and *Ustilago hordei tecta*.

Moreover, these mercury compounds have the advantage that they can be used in neutral solution or emulsion and are not decomposed by atmospheric carbon dioxide.

By addition of indifferent salts the mercury percentage of the products may be regulated as requested and a colouring matter or dyestuff may be added if desired.

It has also been found that these mercury-bases and their salts are very easily soluble in water in presence of alkali metal chlorides such as common salt, potassium chloride, ammonium chloride and of the chlorides of the alkaline earth metals, so that they possess in high degree the free solubility required of materials for steeping grain. It may further be remarked that the mercury-bases or their salts yield no precipitate with spring or river water, whereas in the case of mercury-phenol compounds, which have an alkaline reaction, such precipitation generally occurs.

The preparation of the compositions used for the described treatment of seeds is illustrated by the following examples in which the parts are by weight.

*Example 1.*—2 parts of the complex compound made from aniline hydrochloride and mercuric chloride are finely ground with 1 part of sodium chloride and the mixture is made up by addition of sodium sulphate and a dyestuff to contain a pre-determined amount of mercury.

*Example 2.*—2 parts of the complex compound from aniline hydrochloride and mercuric chloride are finely ground with 1 part of potassium chloride or 1 part of carnallite, and further treated as described in Example 1.

*Example 3.*—2 parts of the compound made from dimethylaniline hydrochloride and mercuric chloride are finely ground with 0.5 part of ammonium chloride and the mixture is made up with sodium chloride to a desired mercury content.

What I claim is:—

1. A compound for application to seed for the destruction of noxious agents such as bacteria and the like, which is readily soluble in water and comprises the complex mercury compound obtained by the action of mercuric chloride on aniline hydrochloride in aqueous solution and in which the mercury is connected to a carbon atom.

2. A compound for application to seed for the destruction of noxious agents such as bacteria and the like, which comprises a solution of a salt of the complex mercury compound obtained by the action of mercuric chloride on aniline hydrochloride in aqueous solution and in which the mercury is connected to a carbon atom.

3. A compound for application to seed for the destruction of noxious agents such as bacteria and the like, which comprises a solution of a complex mercury compound salt obtained by the action of mercuric chloride on aniline hydrochloride in aqueous solution and in which the mercury is connected to a carbon atom, and of an alkali metal chloride.

4. A compound for application to seed for the destruction of noxious agents such as bacteria and the like, which comprises a solution of the complex mercury compound salt obtained by the action of mercuric chloride on aniline hydrochloride in aqueous solution and in which the mercury is connected to a carbon atom, and of potassium chloride.

5. A composition of matter for the treatment of seed in order to destroy noxious agents, such as bacteria and the like, said composition consisting of the complex mercury compound salt obtained by the action of mercuric chloride on aniline hydrochloride in aqueous solution, and of an alkali metal chloride.

6. A composition of matter for the treatment of seed in order to destroy noxious agents, such as bacteria and the like, said composition consisting of the complex mercury compound salt obtained by the action of mercuric chloride on aniline hydrochloride in aqueous solution, and of potassium chloride.

In testimony whereof I have affixed my signature.

AUGUST KLAGES.